United States Patent
Thuliez et al.

Patent Number: 5,667,030
Date of Patent: Sep. 16, 1997

[54] HEAT EXCHANGER FOR MOTOR VEHICLE COOLING SYSTEM

[75] Inventors: Jean-Luc Thuliez, La Neuveville, Switzerland; Tristan Chevroulet, Norwich, Great Britain; Daniel Stoll, Neuchatel, Switzerland

[73] Assignee: SMH Management Services AG, Biel, Switzerland

[21] Appl. No.: 465,361

[22] Filed: Jun. 5, 1995

[30] Foreign Application Priority Data

Jun. 6, 1994 [FR] France .................. 94 06897

[51] Int. Cl.⁶ .................................................. B60K 11/04
[52] U.S. Cl. ................................... 180/68.4; 165/41
[58] Field of Search .................... 180/68.4, 68.6; 165/41, 154; 280/787, 798

[56] References Cited

U.S. PATENT DOCUMENTS

| | | | |
|---|---|---|---|
| 403,644 | 5/1889 | Brown | 165/154 |
| 992,581 | 5/1911 | Noonan et al. | 165/154 |
| 1,217,064 | 2/1917 | Redkey | 165/41 |
| 1,389,771 | 9/1921 | Mellenthin | 165/41 |
| 1,629,234 | 5/1927 | Sturt et al. | 280/781 |
| 1,629,301 | 5/1927 | Pfander | 280/781 |
| 1,633,201 | 6/1927 | Swett | 165/154 |
| 1,724,559 | 8/1929 | Butler | 154/154 |
| 3,323,586 | 6/1967 | Burne et al. | 165/154 |
| 4,497,365 | 2/1985 | Boyer | 165/154 |
| 4,505,124 | 3/1985 | Mayer | 165/41 |

FOREIGN PATENT DOCUMENTS

| | | |
|---|---|---|
| 666204 | 10/1929 | France . |
| 702989 | 4/1931 | France . |
| 786832 | 9/1935 | France . |
| 4128113 | 2/1993 | Germany . |
| 2031 | 11/1913 | United Kingdom . |
| 2261280 | 5/1993 | United Kingdom . |

OTHER PUBLICATIONS

Patent Abstracts of Japan vol. 18, No. 177 (M–1582) 25 Mar. 1994 & JP–A–05 338 573 (Suzuki Motor Corp.) 21 Dec. 1993.

Patent Abstracts of Japan vol. 16, No. 585 (M–1347) 25 Dec. 1992 & JP–A–04 231 269 (Furukawa Alum .Co. Ltd.) 20 Aug. 1992.

*Primary Examiner*—Brian L. Johnson
*Assistant Examiner*—Min Yu
*Attorney, Agent, or Firm*—Griffin, Butler, Whisenhunt & Kurtossy

[57] ABSTRACT

A heat exchanger for a motor vehicle cooling system includes a sleeve-like meter heretically mounted on, and surrounding, a hollow tubular chassis meter of the vehicle. The sleeve is provided with inlets and outlets communicating with the space between the sleeve and the chassis meter and vehicle coolant flows through the inlet and outlet. Air, flowing over the outside surface of the sleeve and the inside surface of the chassis meter, cools the vehicle coolant.

16 Claims, 4 Drawing Sheets

HEAT EXCHANGER FOR MOTOR VEHICLE COOLING SYSTEM

FIELD OF THE INVENTION

The present invention generally relates to a liquid cooling system for a motor vehicle and concerns, more particularly, the heat exchanger for a system of this type.

BACKGROUND OF THE INVENTION

Cooling systems, of the water cooling type, conventionally include a heat exchanger or radiator, in which the water which has been heated on contact with the engine circulates. The radiator is designed so as to have a maximum surface in contact with the air, and it is usually arranged to be perpendicular to the air flow path, either at the front, or at the rear of the vehicle. Generally of a rectangular shape, these conventional radiators constitute a resistance to the flow of air around the moving vehicle, which has a negative effect upon the drag coefficient (or Cx) and, consequently, the performance of the latter. For automobiles with an electric motor, it is particularly important to reduce to the minimum any energy loss as these limit considerably the maximum autonomy of the vehicles. Obtaining a very small Cx is a necessity for vehicles driven by an electric motor and intended to be able to reach speeds in the order of 100 km per hour. It is also highly desirable for the weight of the batteries, which store the basic energy, to be kept to a value as low as possible. The batteries constitute a non negligible part of the total weight of electrically controlled vehicles.

SUMMARY OF THE INVENTION

The invention thus has as an object a heat exchanger for a motor vehicle offering a lower air flow resistance than in the cooling systems of the prior art.

Yet a further object of the invention is an inexpensive heat exchanger for a motor vehicle.

Still a further object of the invention is an easy-to-install heat exchanger for a motor vehicle.

According to one feature of the invention, the heat exchanger for a motor vehicle liquid cooling system is produced to form of a hollow cylindrical cavity.

According to another feature of the invention, the heat exchanger is mounted in the motor vehicle so that its longitudinal axis is substantially parallel to the direction of the air flow in said vehicle.

According to a further feature of the invention the heat exchanger is mounted on a hollow tubular member which is connected to the motor vehicle chassis and forms an integral part of the latter.

The fact of using a heat exchanger with the features mentioned above enables the vehicle's air penetration coefficient to be improved by reducing the apparent surface of this exchanger in the direction of movement. Further, the exchanger may easily be mounted on a tubular member connected to the chassis, which considerably increases the heat exchanging efficiency between the cooling circuit and the surrounding air.

Other objects, features and advantages of the present invention will appear more clearly upon reading the following description of particular embodiments; said description being made by way of non limiting examples and in conjunction with the attached drawings.

DESCRIPTION OF PREFERRED EMBODIMENTS

Figure 1:
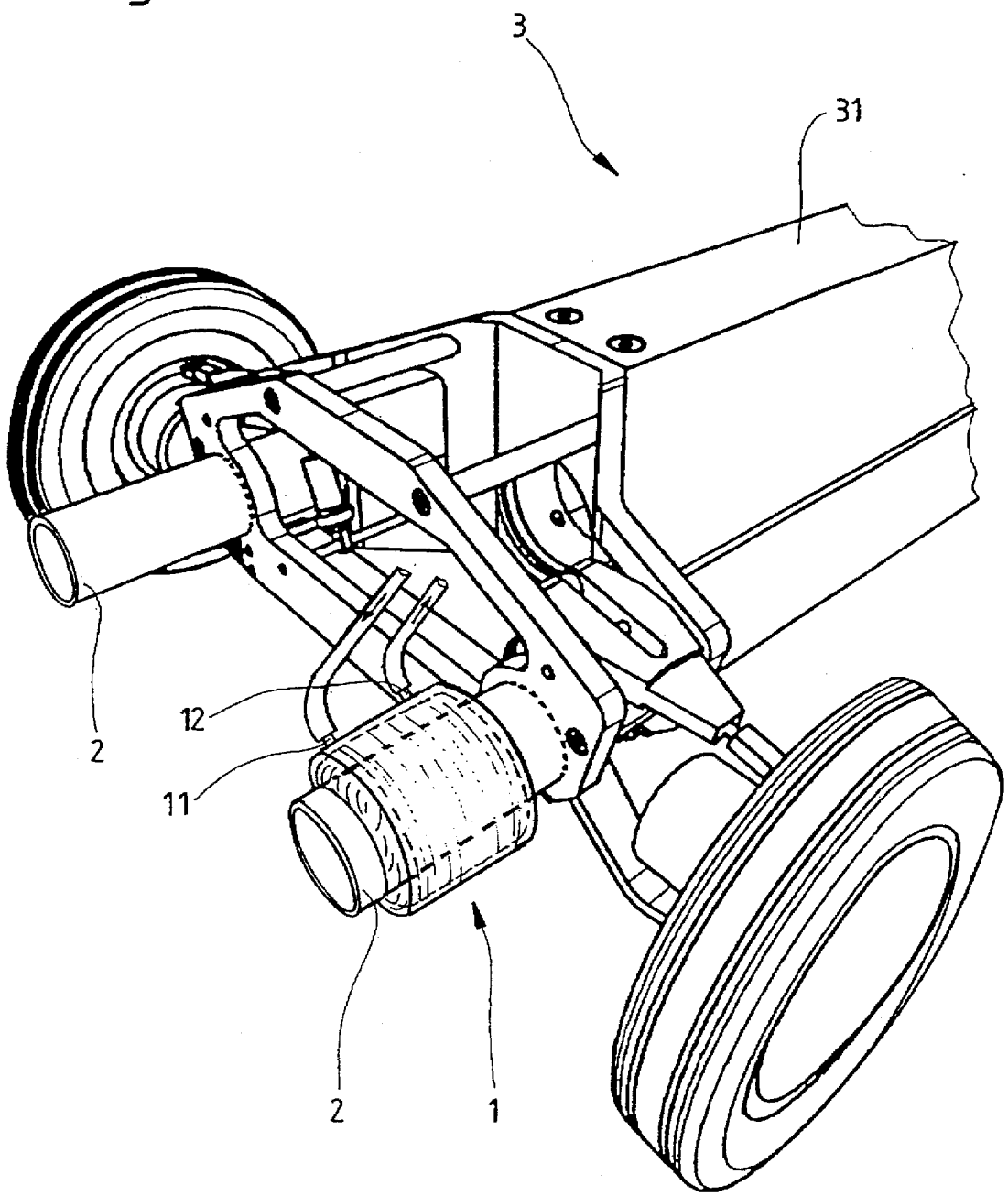
FIG. 1 shows schematically a first example of a heat exchanger according to the invention arranged on a hollow cylindrical member connected to the chassis of a motor vehicle.

FIG. 1 shows an example of a particularly advantageous application of the invention. It shows a part of a chassis as disclosed in U.S. Pat. No. 5,548,510. This chassis 3 comprises a rigid central beam 31 to which elongated tubular members 2 are fixed. The principal function of these tubular members is to form energy absorption zones by deforming themselves in the event of a frontal collision of the vehicle with an obstacle. Since they are hollow and arranged longitudinally in relation to the vehicle, air coming from outside naturally circulates therein when the vehicle is moving. According to the present alternative embodiment it is thus proposed to take advantage of this arrangement by arranging the heat exchanger comprising a sleeve 1 on one or more ends of said tubular members 2. In this way, advantage is taken of the flow of air in tubular member 2 and at the external surface of the latter to dissipate the heat carried by the cooling liquid circulating from the inlet 11 to the outlet 12 of heat exchanger 1. If tubular members 2 are made of a very good heat conducting material such as for example, aluminum or aluminum alloys, the heat exchange is correspondingly better and the contact surface between exchanger 1 and tubular member 2 may be reduced to a minimum.

Figure 2:
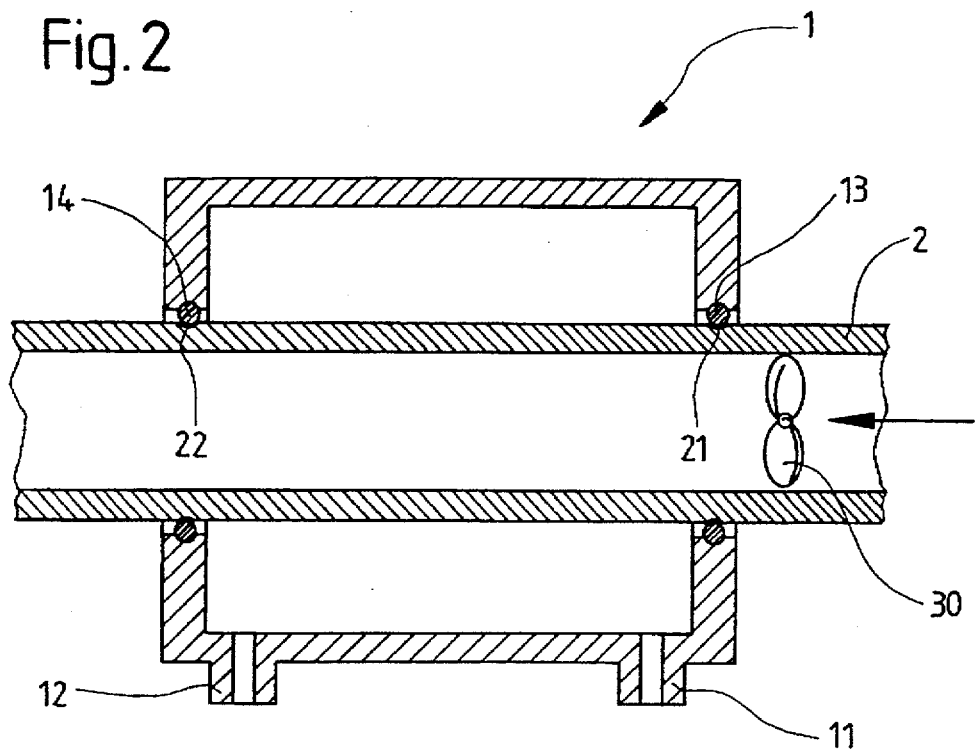
FIG. 2 shows, in cross-section, the heat exchanger of FIG. 1.

FIG. 2 shows, in cross-section, a first embodiment of the heat exchanger mounted as indicated, in FIG. 1. As illustrated in FIG. 2, exchanger 1 has the general shape of a sleeve and consequently does not form a closed cavity. It is thus able to use the external surface of tubular member 2 as an internal wall (when mounted). The direct contact of the cooling liquid with the surface of the tubular member increases the heat exchanging efficiency. The water tightness of the cooling circuit is assured by the O rings 13 and 14. Annular grooves 21 and 22 may be made on the external face of tubular members 2 in order to assure exchanger 1 is maintained in position. In order to enable a good exchange of heat, even when the vehicle is stationary or moving slowly, a fan 30 may be provided to increase the circulation of air in tubular member 2. This fan may for example be conventionally controlled by a thermostat (not shown) arranged in the cooling circuit or in the engine-block of the vehicle.

Figure 3:
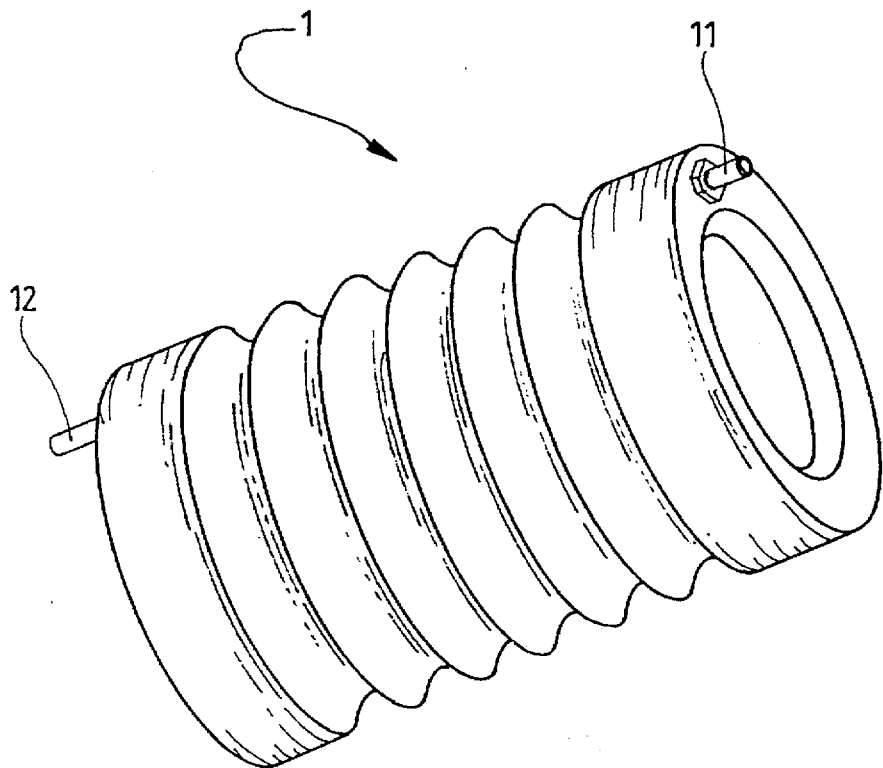
FIG. 3 shows, in perspective view of another embodiment example of a heat exchanger according to the invention.

FIG. 3 shows a heat exchanger according to the invention viewed in perspective. In the preceding figures, the heat exchanger was shown with flat external surfaces for the sake of simplification and also, for the purposes of showing that the preferred heat exchange surface is the one in contact with tubular member 2. All the faces of the exchanger participate in this exchange of heat and, in order to increase the exchange surfaces, it is advantageous to form the exchanger in such a way that its external surfaces have an corrugated profile, as is shown. An exchanger of this type may easily and inexpensively be produced in sheet metal pre-formed by rolling or by pressing and welding. The inlet 11 and outlet 12 nozzles may also be welded onto the principal body of heat exchanger 1.

Figure 4:
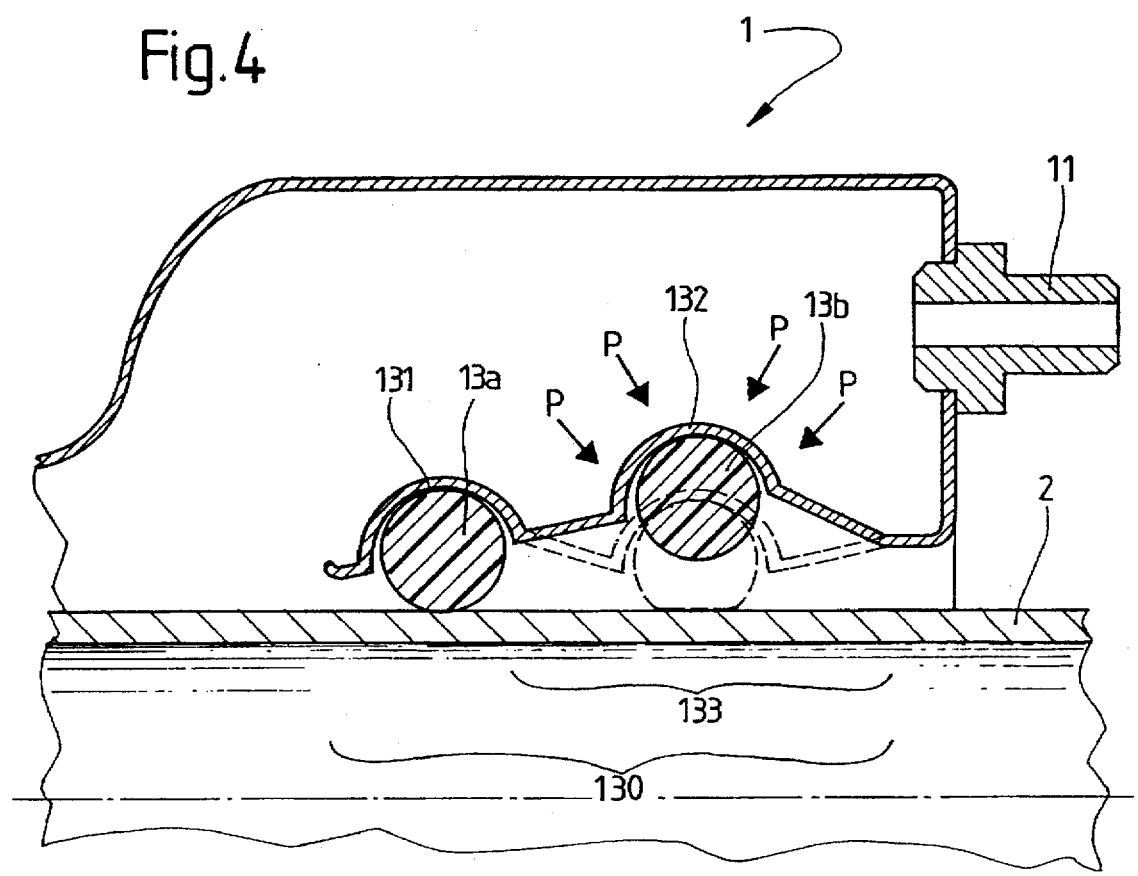
FIG. 4 shows, in cross-section a first alternative embodiment of the mounting means of the heat exchanger of FIG. 3.

FIG. 4 shows, in cross-section, an alternative embodiment of the means for mounting the heat exchanger of FIG. 3. According to this alternative, the interior edge 130, which is intended to come into contact with tubular member 2, is formed so as to have two annular, hollow embossings 131 and 132. These two embossings are provided for receiving two O rings 13.a and 13.b which will assure the water tightness of exchanger 1. Further, part 133 of internal edge 130 is designed so as to be able to be deformed by the action of a pressure P; the effect of said deformation being to apply ring 13.b onto the external surface of tubular member 2. This part 133 is represented in FIG. 3 by an unbroken line in its original form and position and in a dotted line in its final form and position. Mounting an exchanger of this type comprises the following steps. The exchanger is initially positioned on tubular member 2, the leak proofness being at this stage partially assured by O rings. 13.a. Next, pressure P is generated inside the exchanger, by filling the latter with the aid of a gas or a liquid, in order to deform parts 133 so as to apply O rings 13.b to the external surface of tubular member 2.

Figure 5A:
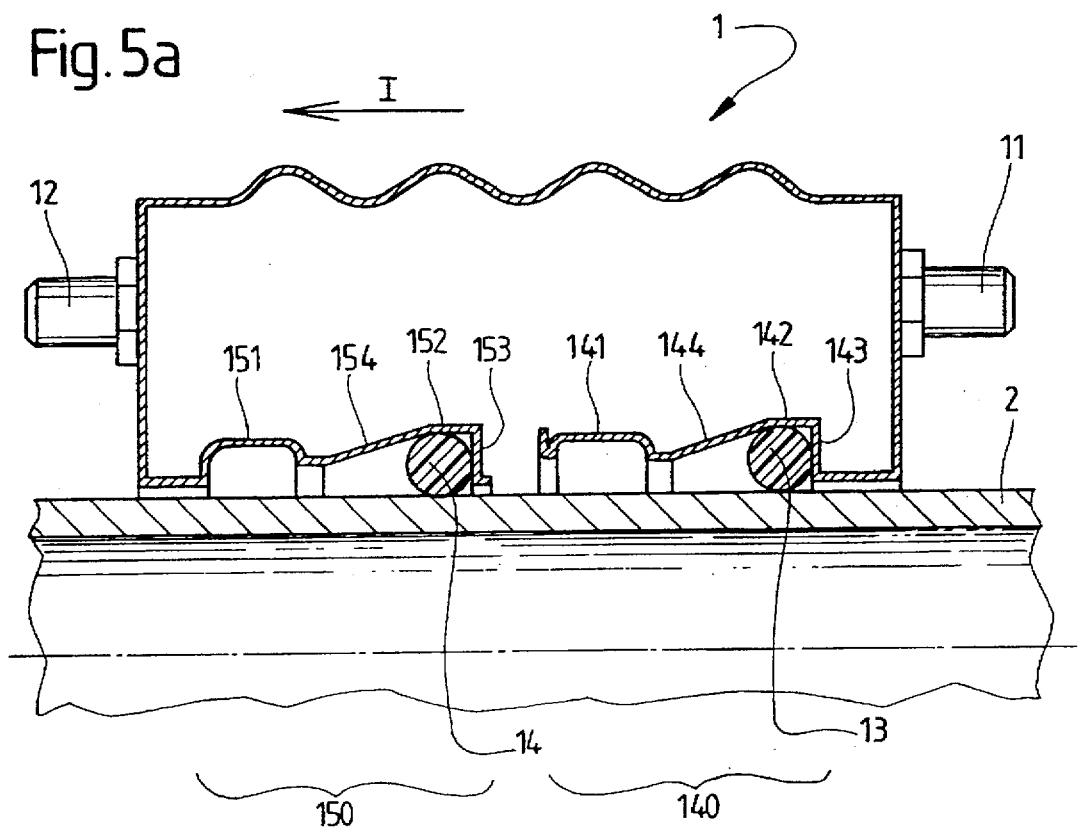
FIGS. 5a and 5b show, in cross-section, a second alternative embodiment of the mounting means of the heat exchanger of FIG. 3.
Figure 5B:
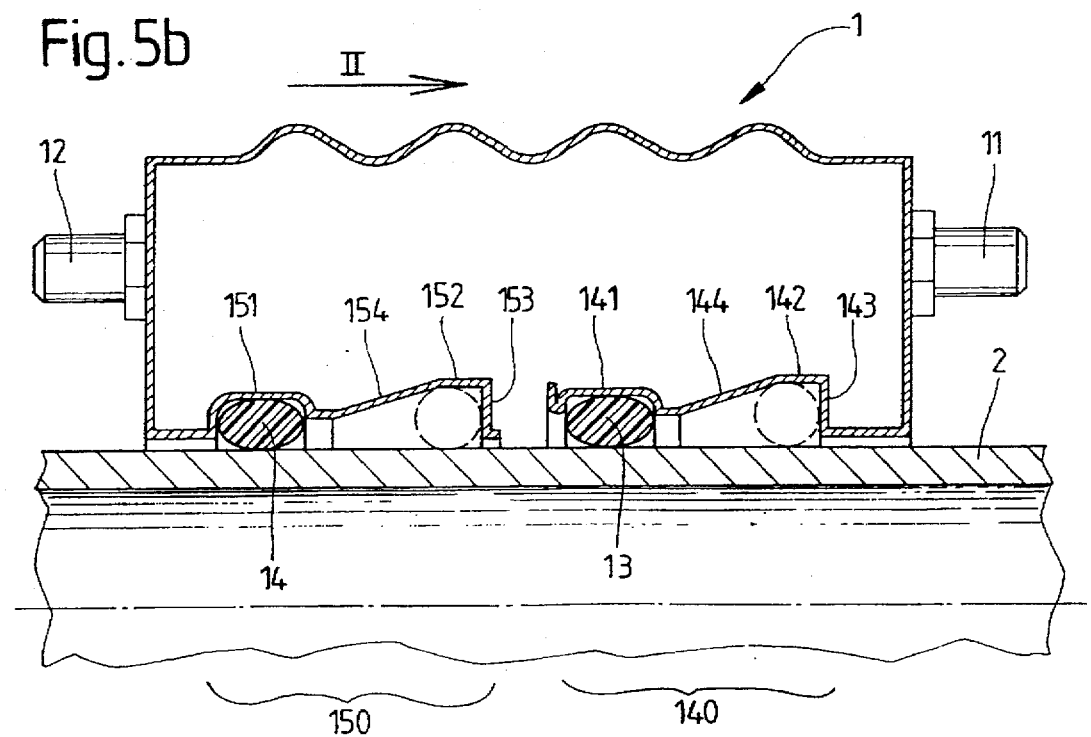

FIG. 5 shows, in partial cross-section, another alternative embodiment of the heat exchanger according to the invention provided with mounting means involving only one O ring for each side of the exchanger. According to this alternative, the internal edges 140 and 150 are formed so as to have a first annular hollow embossing 141 and 151 respectively, and a second annular hollow embossing 142 and 152 respectively. Said second embossings have an inclined section 144 and 154 respectively, and stopping means 143 and 153 respectively. The mounting of this exchanger is carried out in the following manner. Heat exchanger 1 is initially positioned on tubular member 2 in the direction of the arrow I (FIG. 5.a); O rings 13 and 14 having, initially, been placed in said second embossings 142 and 152. During this first phase, the O rings are prevented from coming out of said second embossings by stopping means 143 and 153. Then, in a second phase, a movement backwards of the exchanger (in the direction of the arrow II), causes the relative displacement of O rings 13 and 14 towards said first the embossings 141 and 151. The inclined sections 144 and 154 facilitate the movement of the O rings towards their definitive position illustrated in FIG. 5.b.

In the previously described application examples, it has been considered that there already existed at least one tubular member on which said heat exchanger could be mounted. It is obvious that in such a case, the solution of the invention is particularly advantageous since not only do the tubular members enable said heat exchangers to be mounted easily, but the effect of their attachment to the vehicle chassis is to increase the heat exchanging capacity. Further, the production and assembly costs of such heat exchangers are particularly low. However, it should be understood that the heat exchanger according to the invention may also be advantageously used in vehicles which do not use such tubular members. The heat exchangers must then be arranged so that a sufficient flow of air is produced on the exchanging surfaces; namely the internal and external surfaces. Because of its shape and provided that it is arranged in such a way that its axis is substantially parallel to the direction of the air flow, the air resistance offered by the exchanger will be minimum and the drag coefficient (Cx) will only be slightly affected. It goes without saying that, for a given heat exchanging capacity, the total surface of the exchanger which is not mounted on a chassis member will be substantially greater than that of the exchanger mounted on a tubular member. Finally, if tubular members are not used to mount said exchangers, the latter will, of course, be realised in the form of a completely closed cavity.

Figure 6:
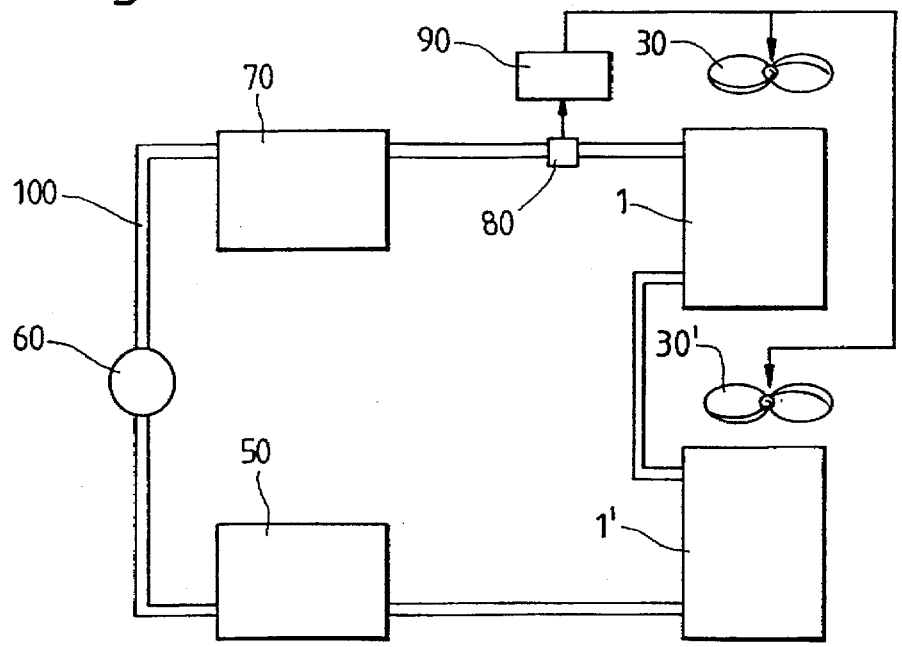
FIG. 6 is a general schematic diagram of the cooling system.

FIG. 6 shows, schematically, a complete cooling system for a motor vehicle. comprising, for example, a heat engine and an electric motor.

This system comprises a liquid cooling circuit (generally water with additives, such as antifreeze) 100, which circulates in the electric motor 70, passes through a first 1 then a second 1' heat exchanger, cools the power components of an electric motor 50 and passes through a circulation pump 60. A temperature sensor 80, arranged in the cooling circuit, is also provided, whose output is used by a control circuit 90 to start the operation of fans 30 and 30' when this temperature becomes excessive. The diagram of FIG. 6 shows only one example among many of a water cooling system able to be used in motor vehicles. It should also be noted that other components may need to be cooled such as, for example, the components of the braking mechanism.

Although the present invention has been described in relation to particular embodiments, it will be understood that the invention is not limited to the described embodiments which may be varied and modified without departing from the scope of the invention as defined by the appended claims.

We claim:

1. A heat exchanger on a motor vehicle comprising a chassis and a liquid cooling system which is connected to an inlet and an outlet of said heat exchanger for circulation of cooling liquid through said heat exchanger, said chassis comprising at least one tubular chassis member made of a heat conducting material and hollow for circulation of air, wherein said heat exchanger comprises an outer sleeve hermetically mounted around said chassis member to form a hollow cylindrical cavity therebetween, said chassis member having an external surface which also forms an internal surface of said heat exchanger.

2. A heat exchanger according to claim 1, characterised in that said tubular hollow member is made of a heat conducting material.

3. A heat exchanger according to claim 1, wherein said sleeve comprises two internal edges each formed so as to have two hollow annular embossings for receiving O-rings assuring water tightness between said sleeve and said chassis member.

4. A heat exchanger according to claim 3, wherein one of said two hollow annular embossings is realised in a deformable part of the internal edge said part being deformable by the effect of a pressure, whereby the O-ring received in said one of said two annular embossings is compressed onto said external surface of said chassis member following the positioning of said exchanger on said tubular member.

5. A heat exchanger according to claim 3, wherein each of said internal edges contains one of said O-rings, which is received in one of said two embossings of said edge in an initial position of said sleeve, and in the other embossing in a definitive position of said sleeve along said chassis member for assuring water tightness of said heat exchanger.

6. A heat exchanger according to claim 1, said heat exchanger being mounted in the vehicle with a longitudinal axis of said heat exchanger substantially parallel to a longitudinal direction of said vehicle.

7. A heat exchanger according to claim 1, said outer sleeve being made of sheet metal and having an external cylindrical surface with a corrugated profile.

8. A heat exchanger on a motor vehicle comprising a chassis and a liquid cooling system which is connected to an inlet and an outlet of said heat exchanger for circulation of cooling liquid through said heat exchanger, said chassis comprising at least one hollow cylindrical chassis member, wherein said heat exchanger is hermetically mounted around said chassis member to form a hollow cylindrical cavity therebetween, said chassis member having an external surface which also forms an internal surface of said heat exchanger, and wherein said heat exchanger comprises two internal edges each being formed so as to have two hollow annular embossings for receiving two O-rings assuring water tightness between said heat exchanger and said chassis member.

9. A heat exchanger according to claim 8, wherein one of said hollow annular embossings is realised in a deformable part of one of said internal edges, said part being deformable by a pressure prevailing in said cavity, whereby an O-ring received in said one of said hollow annular embossings is compressed onto said external surface of said chassis member.

10. A heat exchanger according to claim 8, wherein said chassis member is made of an aluminum-based material.

11. A heat exchanger according to claim 8, wherein said chassis member is arranged longitudinally in said vehicle.

12. A heat exchanger according to claim 8, being made in sheet metal and having an external cylindrical surface having a corrugated profile.

13. A heat exchanger on a motor vehicle having a chassis and a liquid cooling system, said chassis comprising at least one hollow tubular chassis member through which air may pass, said heat exchanger comprising said chassis member in combination with an outer heat exchanger member hermetically mounted around said chassis member to form a hollow cavity between said chassis member and said outer heat exchanger member, said chassis member having an external surface which is also an internal surface of said heat exchanger, said heat exchanger further comprising an inlet and an outlet for connecting said cavity to the vehicle cooling system.

14. A heat exchanger as claimed in claim 13 wherein said chassis member extends substantially parallel to a longitudinal axis of the motor vehicle.

15. A heat exchanger as claimed in claim 13, wherein said hollow cavity is cylindrical.

16. A heat exchanger as claimed in claim 13, wherein said inlet and outlet are disposed in said heat exchanger member.

* * * * *